United States Patent Office 3,548,295
Patented Dec. 15, 1970

3,548,295
TEMPERATURE RESPONSIVE BRIDGE CIRCUITS
Alan John Borer, Crowborough, England, assignor to Servomex Controls Limited, Crowborough, Sussex, England, a British company
Filed Oct. 18, 1968, Ser. No. 768,789
Claims priority, application Great Britain, Oct. 31, 1967, 49,452/67
Int. Cl. G05f 3/02
U.S. Cl. 323—68
8 Claims

ABSTRACT OF THE DISCLOSURE

A temperature responsive bridge circuit having a variable resistance temperature sensor and a comparison resistor in two adjacent limbs of the bridge and ratio transformer parts in the remaining two limbs. The number of turns in one of the transformer parts adjacent the sensor can be varied to balance the bridge or to set the bridge to balance with the sensor at a given temperature. In order to linearise the change in the said number of turns with respect to actual temperature changes, a negative resistance can be shunted across the sensor and/or the number of turns in the other transformer part can be set at various values for use of the bridge over sub-ranges of the maximum temperature range of the bridge.

---

This invention relates to temperature responsive bridge circuits of the type having a variable resistance temperature sensor, such as a platinum resistance thermometer, in one limb of the bridge.

Bridge circuits of this kind compare the resistance of the temperature sensor in a first limb of the bridge with the resistance of a comparison resistor in a second limb of the bridge. However, if the components of the bridge with the exception of the sensor are linear components, adjustments of these components to achieve balance are not linear with the rise in temperature due to non-linearities in the variation of the sensor resistance. For instance, a platinum resistance thermometer ideally has a characteristic defined by the Callendar-Van Dusen equation:

$$R_\mathrm{T} \equiv R_o + \alpha R_o \left\{ T - \delta \left(\frac{TT}{100} - 1\right)\frac{T}{100} - \beta\left(\frac{T}{100} - 1\right)\left(\frac{T}{100}\right)^3 \right\}$$

where:
$R_o$ = the sensor resistance at 0° C.
$R_\mathrm{T}$ = the sensor resistance at T° C.
$\alpha \simeq 0.0039$
$\delta \simeq 1.49$
$\beta = 0$ for T>0° C., and $\beta = 0.11$ for T<0° C.

The above equation is valid for the temperature range of −182.97° C. to +630.5° C.

It is clearly desirable that any adjustment of the bridge circuit should be at least approximately linear with respect to actual changes in temperature over as large a range as possible.

According to the present invention there is provided a temperature responsive bridge circuit including a variable resistance temperature sensor in a first limb of the bridge, a comparison resistor in a second adjacent limb of the bridge, the sensor and resistor each being associated with one part of a ratio-transformer means in their respective other adjacent third and fourth limbs of the bridge, and means for incrementally varying the number of turns of the part of the transformer means in the third limb adjacent with the sensor, the variation of the said number of turns corresponding to changes in resistance of the sensor over a given maximum temperature range in the region of the sensor, and in which there are further provided means for linearising the circuit so that the incremental variations of the said number of turns are approximately linear with respect to actual incremental temperature changes in the region of the sensor, the linearising means comprising either a negative resistance shunted across the sensor and/or means for varying the combined conductance of the second and fourth limbs of the bridge to have predetermined constant values over a plurality of temperature ranges, each of which is a proportion of the said maximum range and a multiple of the said incremental variations in temperature.

In a preferred form the conductance of the second and fourth limbs of the bridge is varied by altering the number of turns of that part of the transformer means in the fourth limb of the bridge.

The invention will now be described in greater detail, by way of example, with reference to the accompanying drawings in which.

Figure 1:
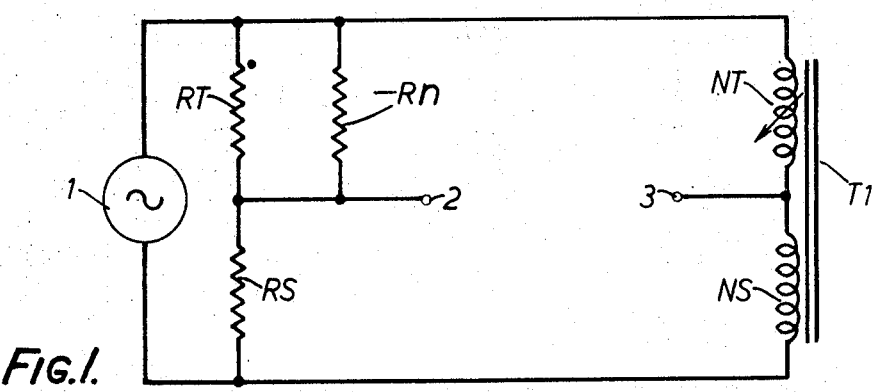
FIG. 1 shows diagrammatically a bridge circuit having a negative resistor shunted across a temperature responsive sensor in accordance with the invention.

Referring now to the drawings, FIG. 1 shows a bridge circuit supplied with an alternating voltage by a generator 1 and arranged to give an output between terminals 2 and 3, the latter suitably being earthed. The bridge components comprise a variable resistance temperature sensor RT shunted by a negative resistance −R$n$, a standard resistor RS and a ratio transformer T$_1$, the upper half of which is designated to have a variable number of turns NT and the lower half of which has a fixed number of turns NS. Balance of the bridge is obtained by varying the number of turns NT, say one turn per degree centigrade. In the absence of the negative resistance −RN the top half of the bridge is non-linear, but by suitable selection of −R$n$ these non-linearities can be ironed out to a large extent. Thus over the temperature range 0° C. to 399° C. the combined conductance of the sensor RT and the negative resistance −R$n$ may vary with actual temperature change to within the error limits of ±0.3° C. or less. Thus the alteration of turns on NT will have a linear relation with respect to actual temperature changes.

Figure 2:
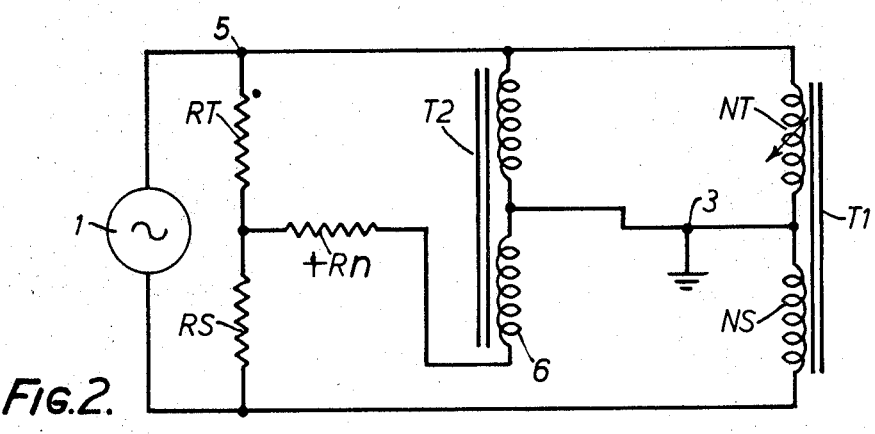
FIG. 2 shows a bridge circuit similar to that shown in FIG. 1.

FIG. 2 shows a practical circuit corresponding to FIG. 1, the negative resistance being provided by a phase converter in the form of a transformer T$_2$ and a positive resistor +R$n$. Clearly the voltages at points 5 and 6 will be 180° out of phase whereby the resistor R$n$ will act as a negative resistance shunted across the sensor RT. Such a circuit is suitable, as already stated, over the range 0° C. to 399° C. but at higher temperatures the error, which is proportional to powers of temperature, becomes large.

Figure 3:
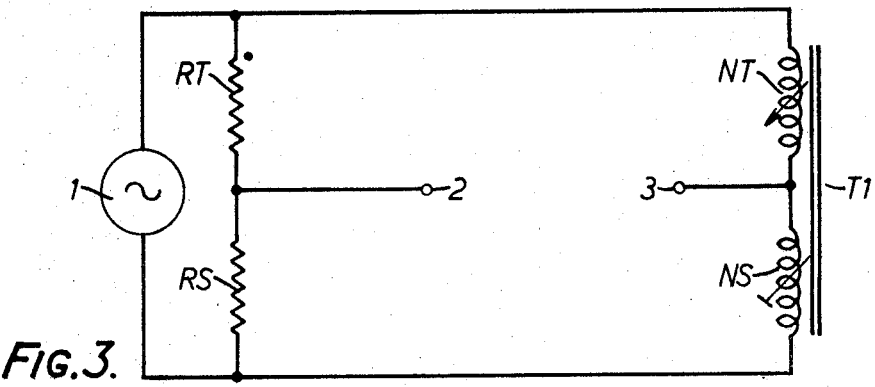
FIG. 3 shows an alternative diagrammatic bridge circuit in accordance with the invention.

The range of linearity can, however, be extended to a range of −99° C. to +599° C., virtually the range of validity of the Callendar-Van Dusen equation, by a circuit such as is shown in FIG. 3. This is similar to FIGS. 1 and 2 but the negative resistance has been dispensed with, although this may be retained for even higher accuracy, and the number of turns NS on the lower half of the ratio transformer T$_1$ can be varied. The number of turns NT can be varied by, say, one turn per degree centigrade over the complete range from −99° C. to +599° C. At the same time the number of turns NS are kept constant over temperature ranges of, say, 100° C.

Thus NS has seven set values, for −99° C., to 0° C., 0° C. to 99° C., 100° C. to 199° C. etc. By suitably choosing these values of NS the bridge is again linearised to give errors of less than ±0.3° C. This arrangement will be described in greater detail with reference to FIG. 4.

Naturally a similar effect will be obtained if NS is kept constant and the value of the standard resistor is changed for every range of 100° C. It will be appreciated that the variation of NT will in each case be linear with respect to incremental temperature changes but this is obtained at the expense of varying NS or RS in a non-linear manner once every 100° C. temperature change.

Figure 4:
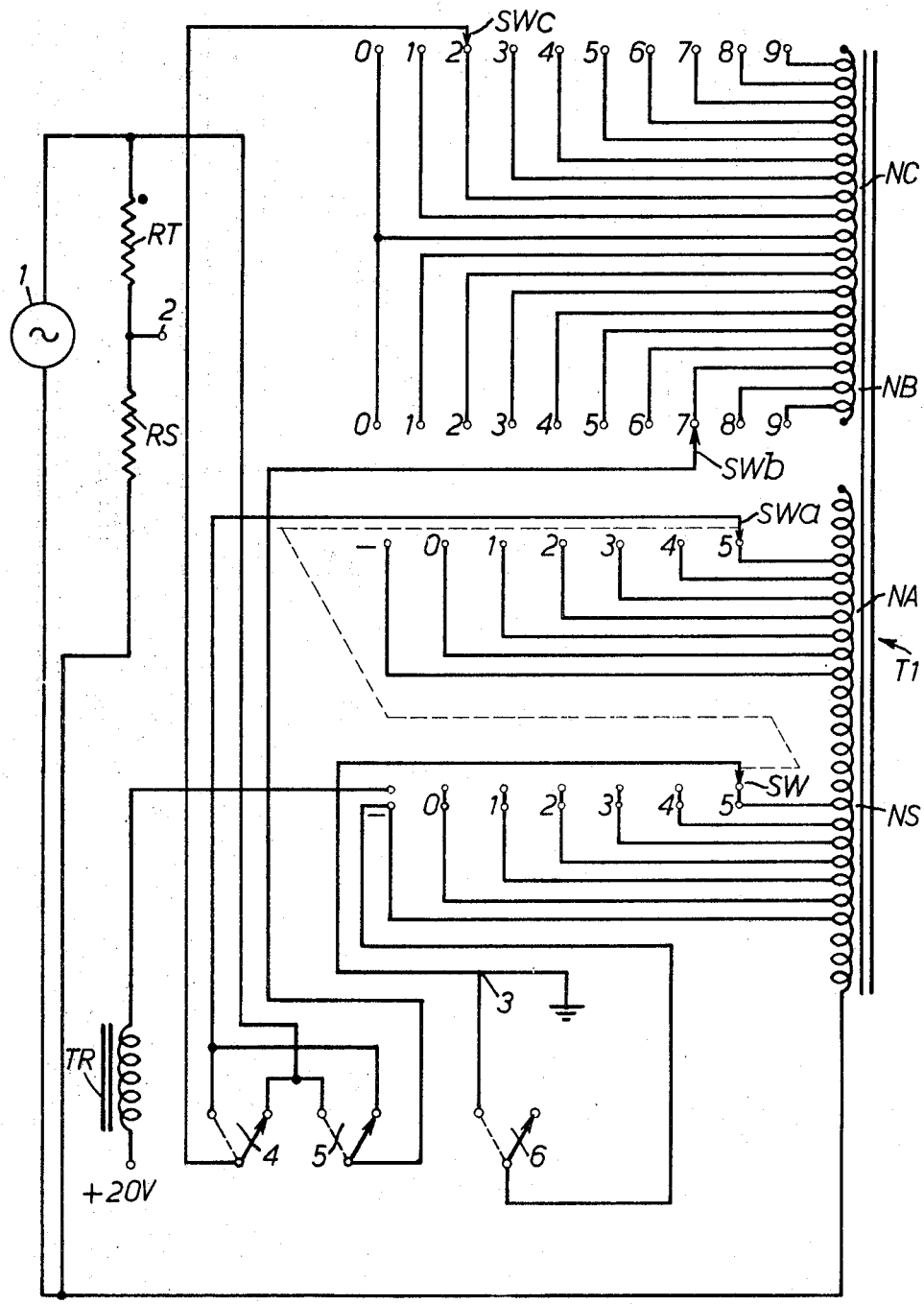
FIG. 4 shows a detailed circuit diagram of the circuit shown in FIG. 3.

FIG. 4 shows a practical circuit, based on that of FIG. 3, showing the winding arrangements of the ratio transformer $T_1$. All the same references are used as in FIG. 3. Thus it will be seen that the lower half of transformer $T_1$ has a switch SW which connects the earthed point 3 to one of six settings marked, −, 0, 1, 2, 3, 4, 5, progressively increasing the number of turns NS. These settings correspond to measurements in the ranges −99° C. to 0° C., 0° C. to 99° C., 99° C. to 199° C. etc. The windings of transformer $T_1$ which are associated with the upper half of the bridge are considered as these sets of turns NA, NB and NC. Turns NA represent hundreds of degrees centigrade, turns NB represent tens of degrees centigrade and turns NC represent single degrees centigrade. Turns NA are provided with a selector switch SW$a$ which is ganged to switch SW (see dotted lines) and also marked with positions −, 0, 1, 2, 3, 4, 5, while turns NB and NC are provided with independent selector switches SW$b$ and SW$c$ each marked with positions 0, 1, 2, 3, 4, 5, 6, 7, 8, 9.

The circuit for a relay TR is completed when switch SW is set to the position marked—whereupon three switches 4, 5, 6 are actuated to the positions shown in dotted line.

With the various switches set as shown in FIG. 4 it will be seen that the ganged switches SW and SW$a$ are in the position marked 5 which indicates that measurement can take place in the temperature range 500° C. to 599° C. Switch SW$b$ is in the position marked 7 and the switch SW$c$ is in the position marked 2. It will be seen that turns NA, NB and NC are connected together to have an additive effect and at balance the temperature in the region of RT will thus be 572° C. Suppose, however, that the ganged switches SW and SW$a$ were to be put into the position marked −. As explained above, the relay TR will operate and the switches 4, 5 and 6 will be actuated. The number of turns NS is now a minimum as required for the range −99° C. to 0° C. and it will be seen that, due to the switching of switches 4 and 5, turns NB and NC will be opposed to turns NA so that the circuit is set for −72° C. In a suitable ratio transformer used in the circuit of FIG. 4, a variation of one turn in NT corresponds to a 1° C. change in temperature. However, the change in number of turns NS between position − and 0 is 17.5, between 0 and 1 is 19, between 1 and 2 is 19.5, between 2 and 3 is 20.5, between 3 and 4 is 24 and between 4 and 5 is 21.5. In this way the linear control of NT with temperature is acquired.

Figure 5:
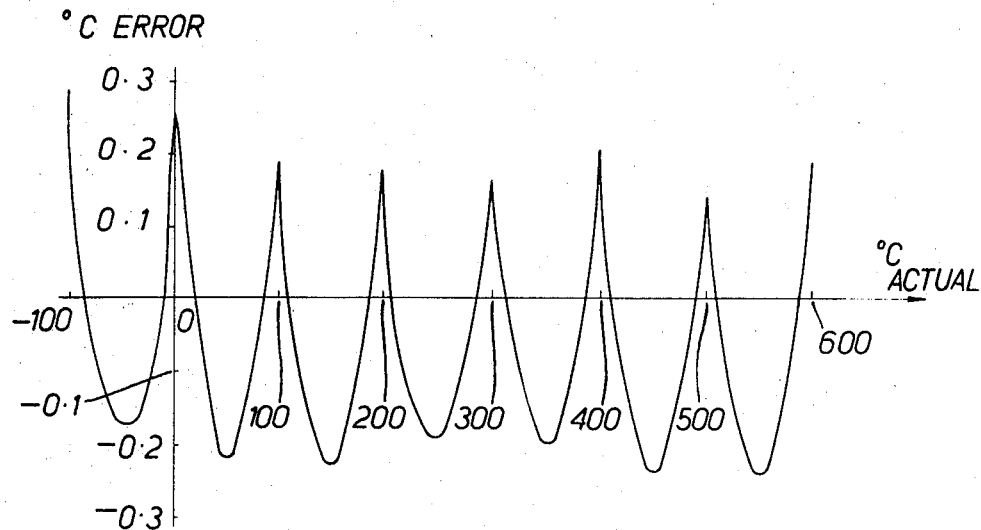
FIG. 5 is the error curve for the bridge of FIG. 4.

FIG. 5 is the error curve of the bridge circuit of FIG. 4 and it will be seen that over each of the seven intervals of 100° C. the error is less than ±0.3° C. and for the most part less than ±0.2° C.

Figure 6:
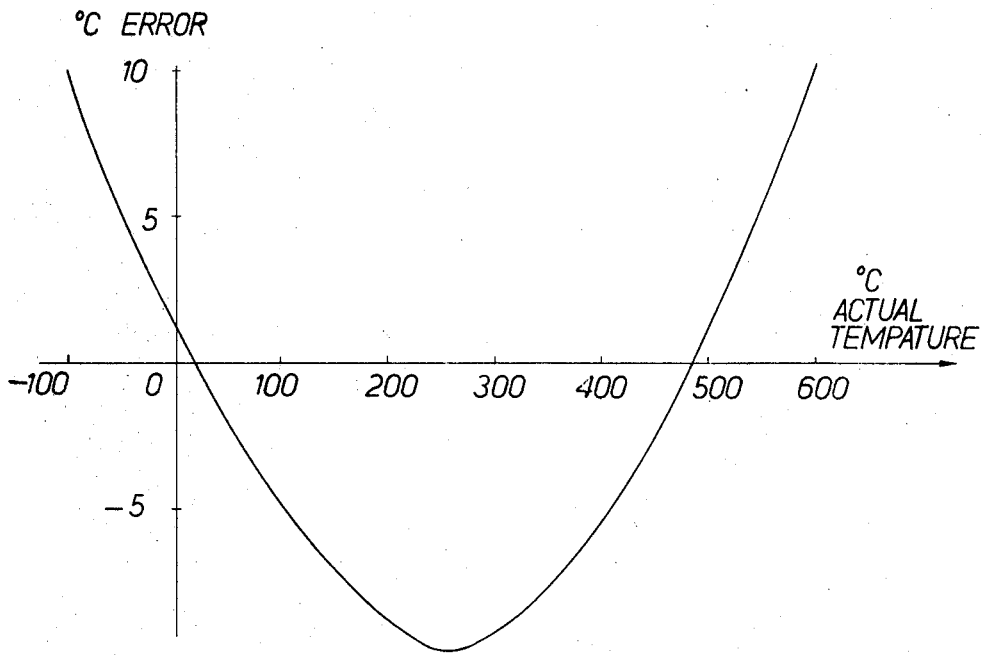
FIG. 6 is the error curve equivalent to that of FIG. 5 but when use of the invention is not made.

This linearity should be compared with FIG. 6 which shows the error if the turns NS are not varied from one 100° C. interval to the next. In this case the error is ±10° C. which is up to fifty times as great.

Figure 7:
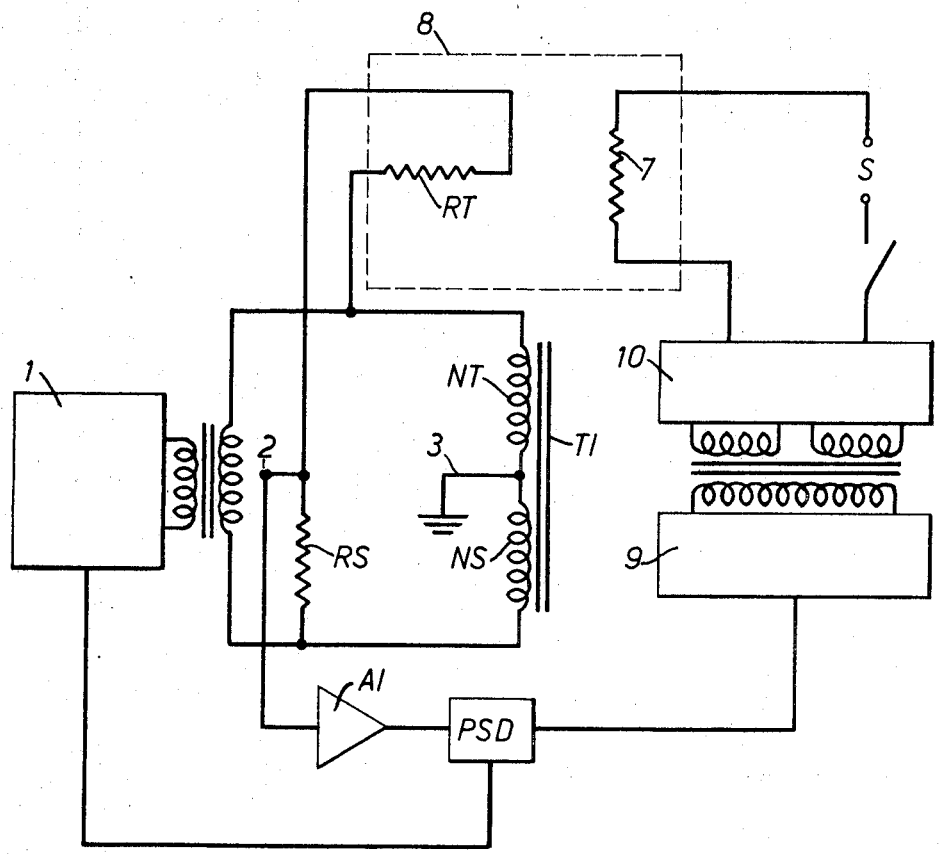
FIG. 7 shows the circuit of FIG. 4 employed to control oven temperature.

FIG. 7 shows the bridge circuit connected so that its output from terminal 2 can be employed to control an oven heater 7. Clearly the sensor RT will also be situated in the oven whereby accurate temperature control can be obtained, the oven 8 being indicated in broken line. Such control has particular use is gas chromatography applications. Referring to FIG. 7, the generator 1 of the previous figures is a square wave generator operating at a frequency of, say, 300 cycles per second and having a negative output impedance such that the sensor current is increased as the sensor resistance increases. This keeps the proportional bandwidth constant with temperature by retaining a substantially constant bridge sensitivity ($dv/dT$). The output of the bridge circuit, taken from point 2, is amplified by an A.C. amplifier A1 and then fed into a phase sensitive detector P.S.D. which also receives a comparison phase signal directly from the generator 1. The output from the phase sensitive detector P.S.D. is equal in amplitude to that of the amplifier A1 and has a sign dependent upon the phase relationship between the bridge output appearing at terminal 2 and the bridge input from the generator 1, zero output representing bridge balance, negative output showing the sensor RT is too hot and positive output showing the sensor is too cold. The phase sensitive detector P.S.D. also serves to smooth out any 50 cycles per second or 300 cycles per second signal and their harmonics.

This output is then fed into control circuitry indicated at 9 which forms no part of the invention and will not be described in detail. The signal fed into the control circuitry 9 from the phase sensitive detector determines the number of pulses applied to the switching circuitry 10 which contains silicon controlled rectifiers (thyristors) for selection of half cycle conduction in the circuit to the heater 7. The heater 7 is supplied from the mains at 11.

Clearly the actual control circuitry of FIG. 7 can be chosen for specific requirements or design preferences and, in particular, modifications can be made to the bridge circuit to eliminate, for instance, the resistance effects of the leads between the sensor RT and the bridge.

I claim:

1. A temperature responsive bridge circuit including in combination:
   (a) a first limb of the bridge including a variable resistance temperature sensor;
   (b) a second limb of the bridge adjacent said first limb and including a comparison resistor;
   (c) a third limb of the bridge adjacent said first limb and including a first part of a ratio transformer means;
   (d) a fourth limb of the bridge adjacent at respective ends said second limb and said third limb, and including a second part of said ratio transformer means;
   (e) adjustment means associated with said first part of said ratio transformer means which allows incremental variation of the number of turns of said first part of said ratio transformer means; and
   (f) linearising means including a negative resistance shunted across said sensor in said first limb.

2. A temperature responsive bridge circuit according to claim 1, in which said linearising means comprises a 180° phase converted and a series resistor.

3. A temperature responsive bridge circuit including in combination:
   (a) a first limb of the bridge including a variable resistance temperature sensor;
   (b) a second limb of the bridge adjacent said first limb and including a comparison resistor;
   (c) a third limb of the bridge adjacent said first limb and including a first part of a ratio transformer means;
   (d) a fourth limb of the bridge adjacent at respective ends said second limb and said third limb, and including a second part of said ratio transformer means;
   (e) first adjustment means associated with said first part of said ratio transformer means, which said first adjustment means allows incremental variation of the number of turns of said first part of said ratio transformer means; and (f) linearising means including second adjustment means associated with said second limb and said fourth limb of said bridge, which said second adjustment means allows a number of predetermined settings of the combined conductance of said second limb and said fourth limb.

4. A temperature responsive bridge circuit according to claim 3, in which said second adjustment means includes a switching arrangement which allows predetermined settings of the number of turns in said second part of said ratio transformer means.

5. A temperature responsive bridge circuit according to claim 4, in which a first junction between said first limb and said third limb is connected to a first output terminal of a generator, a second junction between said second limb and said fourth limb is connected to a second output terminal of said generator, a third junction between said first limb and said second limb is a first output terminal and a fourth junction between said third limb and said fourth limb is a second output terminal.

6. A temperature responsive bridge circuit according to claim 4, in which said second output terminal is earthed.

7. A temperature responsive bridge circuit including in combination:
(a) a first limb of the bridge including a variable resistance temperature sensor;
(b) a second limb of the bridge adjacent said first limb and including a comparison resistor;
(c) a third limb of the bridge adjacent said first limb and including a first part of a ratio transformer means;
(d) a fourth limb of the bridge adjacent at respective ends said second limb and said third limb, and including a second part of said ratio transformer means;
(e) adjustment means associated with said first part of said ratio transformer means which allows incremental variation of the number of turns of said first part of said ratio transformer means;
(f) first linearising means including a negative resistance shunted across said sensor in said first limb; and
(g) second linearising means including second adjustment means associated with said second limb and said fourth limb of said bridge, which said second adjustment means allows a number of predetermined settings of the combined conductance of said second limb and said fourth limb.

8. A temperature responsive bridge circuit according to claim 7, in which said second adjustment means includes a switching arrangement which allows predetermined settings of the number of turns in said second part of said ratio transformer means.

References Cited
UNITED STATES PATENTS 2,944,202   7/1960   Bonaccorsi et al.  ___ 323—75(O)
3,463,999   8/1969   Ames, Jr. _____ 323—69

J D MILLER, Primary Examiner

GERALD GOLDBERG, Assistant Examiner

U.S. Cl. X.R.
323—75; 324—105